UNITED STATES PATENT OFFICE.

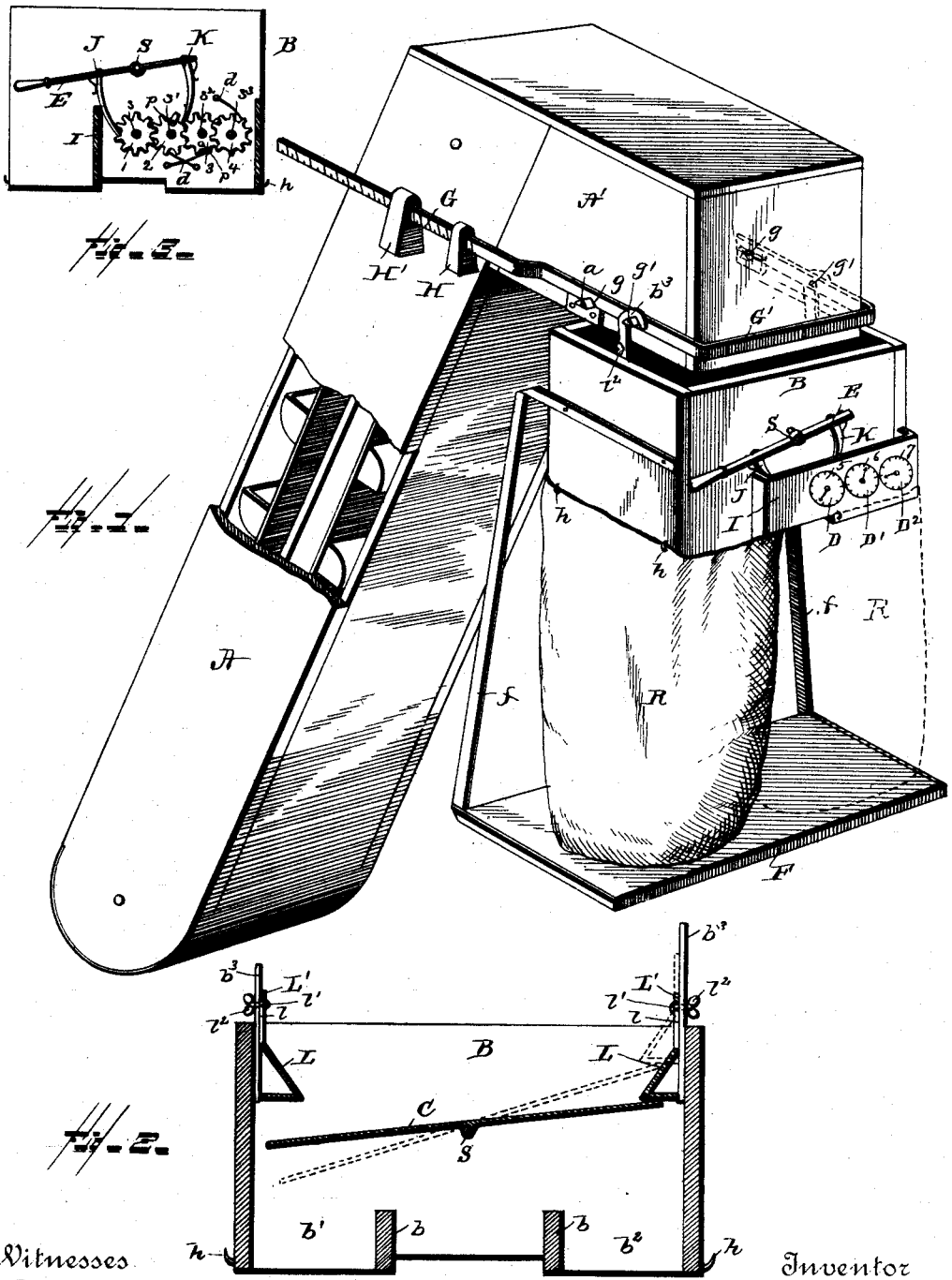

REUBEN N. ROBINSON, OF SIDNEY, OHIO.

GRAIN WEIGHING AND REGISTERING APPARATUS.

SPECIFICATION forming part of Letters Patent No. 422,542, dated March 4, 1890.

Application filed October 19, 1889. Serial No. 327,510. (No model.)

*To all whom it may concern:*

Be it known that I, REUBEN N. ROBINSON, a citizen of the United States of America, residing at Sidney, in the county of Shelby and State of Ohio, have invented certain new and useful Improvements in Grain Weighing and Registering Apparatuses, of which the following is a specification, reference being had therein to the accompanying drawings.

My invention relates to an improved grain weighing and registering apparatus, whereby the stream of grain as it leaves the thrasher-elevator may be directed into one receptacle until a given weight of grain has been deposited therein and then directed to another like receptacle, after which the first one may be removed and replaced by an empty one, the weight of the grain in the different receptacles being registered in the act of changing the course of the stream of grain.

I am aware that various mechanisms have heretofore been devised for weighing grain and registering the weight, and also that machines have heretofore been devised for measuring grain and registering the measures as it (the grain) leaves the thrasher-elevator by directing the stream of grain first into one measuring-compartment of a given capacity and then into another companion compartment, the measure being registered in the act of tilting the chute from one compartment to the other. None of these inventions, however, so far as I am aware, embrace my invention, which will first be described in connection with the accompanying drawings, and then pointed out in the claims.

Figure 1 of the drawings is a perspective view of my apparatus applied to a thrashing-machine elevator. Fig. 2 is an enlarged transverse sectional view of the hopper, showing the tilting apron therein, and means for limiting the movements of the apron. Fig. 3 is a front elevation of the hopper with the register-casing removed, showing the arrangement of the register-wheels and the manner of operating them.

Referring to the drawings, A represents a thrashing-machine elevator, and A′ its discharge-spout, neither of which, as they are both of ordinary construction, requires description.

B represents what I term the "hopper." It is a rectangular box without bottom or top, having two vertical partitions $b$ in its lower portion, running from front to rear, to form passages $b'$ $b^2$ for the grain, and to the upper portion of each end piece of the hopper is secured a projecting arm $b^3$, hooked at its upper end, for a purpose which will hereinafter appear.

C represents the apron mounted centrally on a shaft S, passed through the hopper from front to rear and journaled therein above the partitions $b$ $b'$. The apron is of the full width of the interior of the hopper from front to rear; but it is somewhat shorter than the interior of the hopper from end to end, as shown, in order to afford ample space for the free flow of the grain to the receptacle beneath when the apron is tilted. The shaft S projects a suitable distance through the front wall of the hopper to receive a handle E, which is rigidly secured thereto, and by which the apron is tilted.

A platform F, for supporting the grain-receptacles R, is suspended from the hopper, preferably by metal straps $f$, and the hopper is provided with hooks $h$, on which to hang bags under the passages $b$ and $b'$, when bags are used as the grain-receptacles.

G represents a steelyard, a portion of which is bent into the form of a bail, as at G′, in such manner as to loosely embrace the two sides and front end of the spout A′, the bail being notched at $g$ to engage with fulcrum-pins $a$ on the sides of the spout. The hopper, with its connected platform, is suspended from the steelyard by its hooked arms $b^3$ in engagement with pins $g'$ on the sides of the bail. By this construction of the steelyard I am enabled to attach both ends of the hopper to it, whereby they are prevented from tilting and the platform and the grain-receptacles are at all times held in their proper positions. The steelyard is provided with two weights H H′, the weight H serving as a counter-balance for the hopper, the platform, and the two empty receptacles, the other weight H′ serving to indicate the net weight of grain.

The mechanism which I employ for registering the various weights of the grain is constructed as follows: 1, 2, 3, and 4 are four small toothed wheels, whose shafts $s\ s'\ s^2\ s^3$ are journaled in the front side of the hopper and in a casing I, secured to the hopper. 2 represents the units-wheel provided with a laterally-extending pin $p$ for engagement with the teeth of the tens-wheel 3, this last-mentioned wheel being also provided with a like pin for engagement with the teeth of the hundreds-wheel 4, in a manner well understood in registering mechanisms, these three wheels 2 3 4 being arranged in different planes with respect to each other. Wheel 1 is in the same plane with the units-wheel and its teeth mesh with the teeth of that wheel. The units, tens, and hundreds wheels are each provided with a detent $d$ to prevent reverse movement.

The shafts $s'\ s^2\ s^3$ of the units, tens, and hundreds wheels respectively pass through the casing I and bear pointers 5 6 7 on their outer ends for indicating on properly-numbered dials D D′ D², secured on the front of said casing, the various weights to be registered in a well-known manner.

J K are two pawls pivoted to the handle E on either side of its point of attachment to the shaft S. Pawl J engages with the teeth of wheel 1 on the left-hand side and pawl K engages with the teeth of the units-wheel 2 on the right-hand side, so that no matter whether the apron be tilted toward one end or the other all the wheels will be moved in the proper directions.

L L represent two vertically-adjustable gages, one at each end of the hopper on the inner side and extending clear across the hopper from front to rear. They are made, preferably, of sheet metal and of the form shown in Fig. 2—that is to say, with a straight inwardly-projecting bottom and downwardly-sloping face—the upper portion of each gage being provided with a straight arm L′, vertically slotted, as at $l$, through which and the arm $b^3$ on the hopper is passed a headed bolt $l'$, whose outer end is screw-threaded and provided with a thumb-nut $l^2$. These gages have the double function of limiting the arc described by the apron and covering the space between that end of the apron which is tilted upward and the wall of the hopper.

The operation of my improved grain weigher and register is as follows: A grain-receptacle being placed under each passage $b'\ b^2$, (in the drawings but one bag is shown in full lines, the position of the other one being indicated by dotted lines,) the counterbalance H is then set, after which the weight H′ is set to the required number of pounds of grain to be placed in each bag or other receptacle, the apron meanwhile occupying a horizontal position. If one bushel of wheat is the unit of measurement, and so marked on the dial of the units-wheel, the weight H′ is set to weigh sixty pounds of grain, and the adjustable guides L L are placed in their lowest position. Now, the operator, by means of the handle E, tilts apron C so as to direct the grain falling onto it from the elevator-spout into one of the bags, and at the same time through the pawls J K, attached to the handle, moves the units-wheel one number. When the first bag has received sixty pounds of grain, the operator tilts the apron to the other side, so that the other bag may be filled while he removes the first one and replaces it by an empty one. Now, I will assume that two bushels of grain are to be placed in each bag, in which case the weight H′ is set to weigh one hundred and twenty pounds, and the guides L L are raised so that the apron can be swung in an arc sufficient to permit the pawls J K to skip a tooth in each of the wheels 1 and 2 as the apron is tilted, whereby the pointer on the units-wheel shaft will register two units at once. Of course, if the unit of measurement should be less than sixty pounds, it might be desirable to register more than two measures at once, in which case the throw of the pawls would be governed only by the arc that the apron could be swung in and still serve its purpose.

Having thus described my invention, what I claim as new, and desire to secure by Letters Patent, is—

1. In a grain weigher and register, the combination, with a hopper having a grain-passage at each end in its lower portion, of an apron mounted upon a shaft journaled in two walls of the hopper, guides adjustably secured within the hopper to limit the movements of the apron, and mechanism outside the hopper to tilt the apron, substantially as described.

2. In a grain weigher and register, the combination, with a hopper having a grain-passage at each end in its lower portion, of an apron mounted upon a shaft journaled in two walls of the hopper and provided with an operating-handle outside of the hopper, guides adjustably secured within the hopper to limit the movements and cover the upwardly-tilted end of the apron, a registering apparatus on the hopper, and pawls pivoted to the handle for operating said apparatus as the apron is tilted, substantially as described.

3. The combination, with the elevator-spout provided with a projecting pin on each side, of a steelyard shaped to loosely embrace the two sides and front of the spout and fulcrumed on said pins, a hopper provided with a hooked arm at each end for engagement with pins projecting from the sides of the steelyard, and having a grain-passage at each end in its lower portion, an apron mounted on a shaft journaled in the hopper, said shaft being provided with a handle, adjustable guides for limiting the movements and covering the upwardly-tilted end of the apron, a registering apparatus on the hopper, and pawls pivoted to the handle for operating said apparatus as the apron is tilted, all substantially as described.

In testimony whereof I affix my signature in presence of two witnesses.

REUBEN N. ROBINSON.

Witnesses:
W. D. DAVIES,
E. L. HOSKINS.